(12) United States Patent
Kawano (10) Patent No.: US 10,656,119 B2
(45) Date of Patent: May 19, 2020

(54) DISPERSOID PARTICLE ANALYZING METHOD AND ANALYZING APPARATUS

(71) Applicant: KAWANO Lab. Inc., Osaka (JP)

(72) Inventor: Makoto Kawano, Ikeda (JP)

(73) Assignee: KAWANO Lab. Inc., Osaka (JP)

( * ) Notice: Subject to any disclaimer, the term of this patent is extended or adjusted under 35 U.S.C. 154(b) by 214 days.

(21) Appl. No.: 15/739,495

(22) PCT Filed: Jun. 24, 2016

(86) PCT No.: PCT/JP2016/068850
§ 371 (c)(1),
(2) Date: Dec. 22, 2017

(87) PCT Pub. No.: WO2016/208724
PCT Pub. Date: Dec. 29, 2016

(65) Prior Publication Data
US 2018/0196004 A1 Jul. 12, 2018

(30) Foreign Application Priority Data

Jun. 26, 2015 (JP) ................. 2015-128730

(51) Int. Cl.
*G01N 27/76* (2006.01)
*G01N 15/06* (2006.01)
(Continued)

(52) U.S. Cl.
CPC ......... *G01N 27/76* (2013.01); *G01N 15/0656* (2013.01); *G01N 15/088* (2013.01); *G01N 15/1031* (2013.01); *G01N 15/1456* (2013.01); *G01N 15/1468* (2013.01); *G01N 2015/1493* (2013.01)

(58) Field of Classification Search
CPC .. G01N 27/76; G01N 15/088; G01N 15/1031; G01N 15/0656
See application file for complete search history.

(56) References Cited

U.S. PATENT DOCUMENTS 9,366,614 B2 6/2016 Kawano et al.
2011/0226699 A1* 9/2011 Rosenberg .............. C02F 1/285
210/688

(Continued)

FOREIGN PATENT DOCUMENTS

| JP | 2005-030883 A | 2/2005 |
| WO | 2013/021910 A1 | 2/2013 |
| WO | 2015/030184 A1 | 3/2015 |

OTHER PUBLICATIONS

International Search Report issued in PCT/JP2016/068850; dated Sep. 20, 2016.

*Primary Examiner* — Paul M. West
(74) *Attorney, Agent, or Firm* — Studebaker & Brackett PC (57) ABSTRACT

A volume susceptibility ($\chi s1$) of a first dispersoid particle (s1) is obtained. A second dispersoid particle (s2) that is the first dispersoid particle (s1) to which an adsorbate is adsorbed is obtained. A volume susceptibility ($\chi s2$) of the second dispersoid particle (s2) is obtained. An amount of a functional group of the first dispersoid particle (s1) is analyzed through obtaining an amount of the adsorbate included in the second dispersoid particle (s2) based on the volume susceptibilities ($\chi s1$) and ($\chi s2$) of the first and second dispersoid particles (s1) and (s2).

10 Claims, 4 Drawing Sheets

(51) Int. Cl.
*G01N 15/08* (2006.01)
*G01N 15/10* (2006.01)
*G01N 15/14* (2006.01)

(56) References Cited

U.S. PATENT DOCUMENTS

2014/0174157 A1 6/2014 Kawano et al.
2016/0209366 A1 7/2016 Kawano et al.

* cited by examiner

DISPERSOID PARTICLE ANALYZING METHOD AND ANALYZING APPARATUS

TECHNICAL FIELD

The present invention relates to a dispersoid particle analyzing method and an analyzing apparatus for analyzing a dispersoid particle (for example, a particle).

BACKGROUND ART

The present inventors proposed a method for measuring a voidage of a dispersoid particle using a volume susceptibility (magnetic susceptibility per unit volume) of the dispersoid particle (Patent Literature 1). The present inventors also proposed a method for measuring a surface area of a dispersoid particle, the number of pores formed in the dispersoid particle, and respective average values of diameters, depths, and volumes of the pores using a volume susceptibility of the dispersoid particle (Patent Literature 2).

CITATION LIST

Patent Literature

[Patent Literature 1] International Publication No. 2013/021910
[Patent Literature 2] International Publication No. 2015/030184

SUMMARY OF INVENTION

Technical Problem

The inventors have accomplished the present invention through continuous diligent study on a method for analyzing a dispersoid particle. The present invention accordingly has its object of providing a dispersoid particle analyzing method and an analyzing apparatus for analyzing an amount of a functional group of a dispersoid particle.

Solution to Problem

A dispersoid particle analyzing method according to the present invention includes: obtaining a volume susceptibility of a first dispersoid particle; obtaining a second dispersoid particle that is the first dispersoid particle to which an adsorbent is adsorbed; obtaining a volume susceptibility of the second dispersoid particle; and analyzing an amount of a functional group of the first dispersoid particle through obtaining an amount of the adsorbent included in the second dispersoid particle based on the volume susceptibilities of the first and second dispersoid particles.

In one embodiment, the adsorbate contains a cationic magnetic material in a situation in which the functional group is anionic. Alternatively, the adsorbate contains an anionic magnetic material in a situation in which the functional group is cationic.

A first analyzing apparatus according to the present invention includes a magnetic field generating section, a measurement section, and an operation section. The measurement section measures movement of a first dispersoid particle dispersed in a dispersion medium and movement of a second dispersoid particle dispersed in the dispersion medium while the magnetic field generating section generates a magnetic field. The operation section calculates respective volume susceptibilities of the first and second dispersoid particles based on a result of measurement by the measurement section. The second dispersoid particle is the first dispersoid particle to which an adsorbate is adsorbed. The operation section calculates an amount of the adsorbate included in the second dispersoid particle based on the volume susceptibilities of the first and second dispersoid particles.

In one embodiment, the operation section analyzes an amount of a functional group of the first dispersoid particle based on the amount of the adsorbate.

In one embodiment, the adsorbate contains a cationic magnetic material in a situation in which the functional group of the first dispersoid particle is anionic. Alternatively, the adsorbate contains an anionic magnetic material in a situation in which the functional group of the first dispersoid particle is cationic.

A second analyzing apparatus according to the present invention includes an operation section. Based on a volume susceptibility of a first dispersoid particle and a volume susceptibility of a second dispersoid particle, the operation section calculates an amount of an adsorbate included in the second dispersoid particle. The second dispersoid particle is the first dispersoid particle to which the adsorbate is adsorbed.

In one embodiment, the operation section analyzes an amount of a functional group of the first dispersoid particle based on the amount of the adsorbate.

Advantageous Effects of Invention

According to the present invention, the amount of the functional group of the dispersoid particle can be analyzed.

DESCRIPTION OF EMBODIMENTS

The following describes an embodiment of the present invention with reference to the accompanying drawings. Like numerals denote like elements or corresponding elements in the drawings, and description thereof is not repeated.

Figure 1:
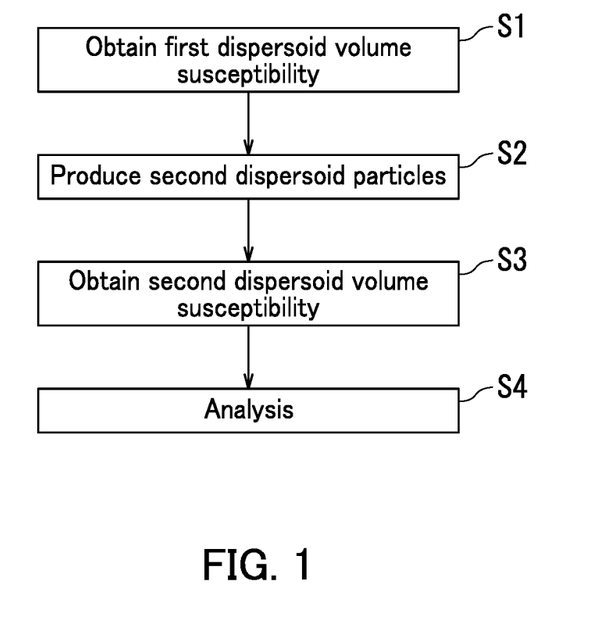
FIG. 1 is a flowchart depicting a dispersoid particle analyzing method according to an embodiment of the present invention.

FIG. 1 is a flowchart depicting a dispersoid particle analyzing method according to the present embodiment of the present invention. As depicted in FIG. 1, the dispersoid particle analyzing method according to the present embodiment includes a process (Step S1) of obtaining a volume susceptibility $\chi s1$ of a first dispersoid particle s1 (also referred to below as a first dispersoid particle volume susceptibility $\chi s1$). In the present embodiment, the volume susceptibility $\chi s1$ of the first dispersoid particle s1 in a dispersion medium m is obtained by magnetophoresis. The dispersoid particle analyzing method according to the present embodiment further includes a process (Step S2) of obtaining a second dispersoid particle s2 that is the first dispersoid particle s1 to which an adsorbate is adsorbed. The dispersoid particle analyzing method according to the present embodiment still includes a process (Step S3) of obtaining a volume susceptibility $\chi$s2 of the second dispersoid particle s2 (also referred to below as a second dispersoid particle volume susceptibility $\chi$s2). In the present embodiment, the volume susceptibility $\chi$s2 of the second dispersoid particle s2 in the dispersion medium m is obtained by magnetophoresis. The dispersoid particle analyzing method according to the present embodiment yet includes a process (Step S4) of analyzing an amount of a functional group of the first dispersoid particle s1 (also referred to below as a functional group amount) through obtaining an amount of the adsorbate included in the second dispersoid particle s2 based on the first and second dispersoid particle volume susceptibilities $\chi$s1 and $\chi$s2. Note that the execution order of Steps S1, S2, and S3 is appropriately interchangeable.

No particular limitation is placed on the dispersion medium m as long as the dispersoid particle s can perform magnetic migration in the dispersion medium m. The dispersion medium m may be a liquid or a gas. For example, the dispersion medium m may be selected from among water, methanol, ethanol, 1-propanol, acetonitrile, acetone, and the like. Alternatively, the dispersion medium m may be a mixture of any two or more of water, methanol, ethanol, 1-propanol, acetonitrile, acetone, and the like. Or, the dispersion medium m may be air, for example.

No particular limitation is placed on the adsorbate as long as the adsorbate is capable of being chemically adsorbed to the functional group of the first dispersoid particle s1. In a situation for example in which the functional group of the first dispersoid particle s1 is anionic, a cationic magnetic material can be used as an adsorbate. Alternatively, a compound containing a cationic magnetic material can be used. By contrast, in a situation in which the functional group of the first dispersoid particle s1 is cationic, an anionic magnetic material can be used as an adsorbate. Alternatively, a compound containing an anionic magnetic material can be used. Note that the cationic magnetic material is preferably a ferromagnetic material. Use of a ferromagnetic material can facilitate obtainment of the amount of the adsorbate (also referred to below as an adsorbate amount) included in the second dispersoid particle s2. For the same reason as above, the anionic magnetic material is preferably a ferromagnetic material.

The second dispersoid particle s2 can be obtained by mixing the first dispersoid particle s1 with an adsorbent. The adsorbent may contain a cationic or anionic magnetic material. Alternatively, the adsorbent may contain a compound containing a cationic or anionic magnetic material. The adsorbent may be a solvent in a solution or the like.

Figure 2:
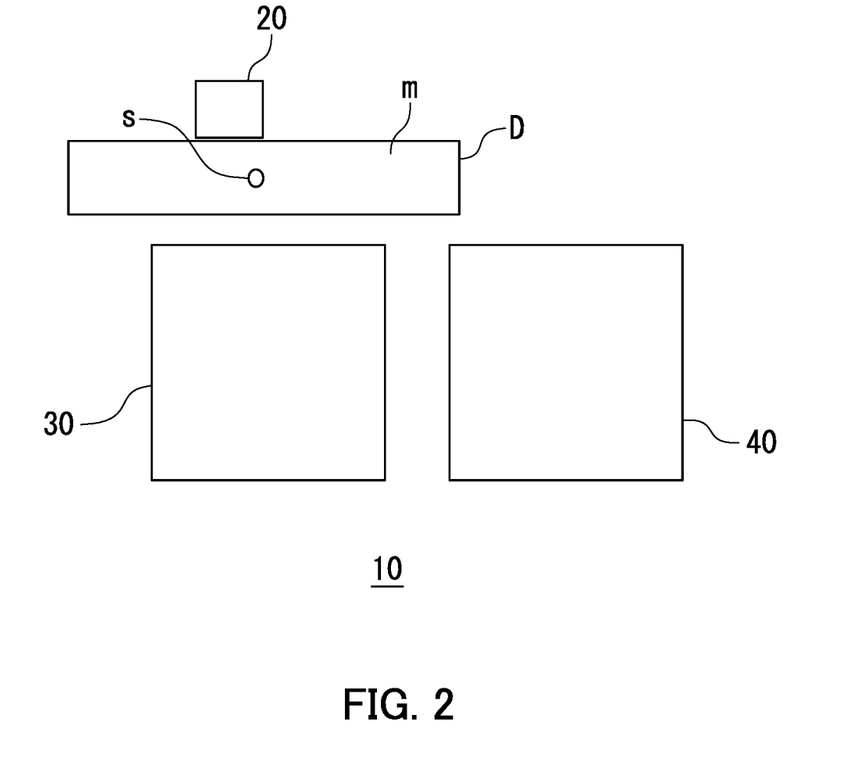
FIG. 2 is a schematic diagram illustrating an analyzing apparatus according to the embodiment of the present invention.

Subsequently, a description will be made about a method for obtaining a volume susceptibility $\chi$s of the dispersoid particle s (also referred to below as a dispersoid particle volume susceptibility $\chi$s) by magnetophoresis (details of Steps S1 and S3). FIG. 2 is a schematic diagram illustrating an analyzing apparatus 10 according to the present embodiment. The analyzing apparatus 10 is used for implementing the dispersoid particle analyzing method in the present embodiment. Use of the analyzing apparatus 10 enables obtainment of the first and second dispersoid particle volume susceptibilities $\chi$s1 and $\chi$s2.

The analyzing apparatus 10 includes a magnetic field generating section 20, a measurement section 30, and an operation section 40. A disperse system D that is the dispersion medium m in which the dispersoid particle s is dispersed is disposed in the vicinity of the magnetic field generating section 20. The disperse system D is put into a tubular member, for example. Specifically, a capillary C into which the disperse system D is put is disposed in the vicinity of the magnetic field generating section 20. The capillary C is made of glass, for example. Furthermore, the capillary C may have a substantially square shape that measures about 100 µm square in section perpendicular to an axial direction thereof. The dispersoid particle s in a state of being dispersed in the dispersion medium m is introduced into the capillary C by the capillary action or a pump. However, the capillary C is not limited to a glass-made capillary having a square section. The capillary C may have any shape as long as magnetic migration of the dispersoid particle s in the capillary C is observable. The capillary C may be made of any material as long as magnetic migration of the dispersoid particle s in the capillary C is observable.

The magnetic field generating section 20 includes a superconducting magnet, a magnetic circuit, a permanent magnet, or the like. For example, the magnetic field generating section 20 preferably generates a strong magnetic field having a large magnetic field gradient using pole pieces. Note that although a dispersoid particle s is illustrated in FIG. 2, a plurality of dispersoid particles s may be present in the dispersion medium m.

Once the magnetic field generating section 20 generates a magnetic field in the disperse system D, the dispersoid particle s performs magnetic migration in the dispersion medium m. The measurement section 30 measures movement (magnetic migration) of the dispersoid particle s in the dispersion medium m (disperse system D) while the magnetic field generating section 20 generates the magnetic field.

The operation section 40 is a personal computer, for example. The operation section 40 obtains a magnetic migration speed v of the dispersoid particle s from a result measured by the measurement section 30. For example, the operation section 40 may obtain the magnetic migration speed v from time-varying positional change of the dispersoid particle s measured by the measurement section 30. Specifically, it is possible that the measurement section 30 images the dispersoid particle s at predetermined time intervals and the operation section 40 obtains the magnetic migration speed v from results of the imaging.

The operation section 40 obtains a dispersoid particle volume susceptibility $\chi$s from the magnetic migration speed v. Specifically, the operation section 40 calculates the dispersoid particle volume susceptibility $\chi$s by referencing the following equation (1).

$$v=2(\chi s-\chi m)r^2(1/9\eta\mu_0)B(dB/dx) \quad (1)$$

In equation (1), r represents a radius of the dispersoid particle s. Also, $\chi$m represents a volume susceptibility of the dispersion medium m and $\eta$ represents a viscosity coefficient of the dispersion medium m. Furthermore, $\mu_0$ represents a vacuum magnetic permeability and B(dB/dx) represents a magnetic field gradient.

A literature value can be used as the radius r of the dispersoid particle s. Alternatively, the radius r of the dispersoid particle s may be obtained through measurement. For example, the radius r of the dispersoid particle s can be measured from an image of the dispersoid particle s imaged by the measurement section 30. A literature value can be used as the volume susceptibility $\chi$m of the dispersion medium m. Alternatively, the volume susceptibility $\chi$m of the dispersion medium m may be measured using a superconducting quantum interference device (SQUID) element or a magnetic balance. The viscosity coefficient η of the dispersion medium m and the vacuum magnetic permeability μo each are a constant. The magnetic field gradient B(dB/dx) is an apparatus constant and is measurable.

Figure 3:
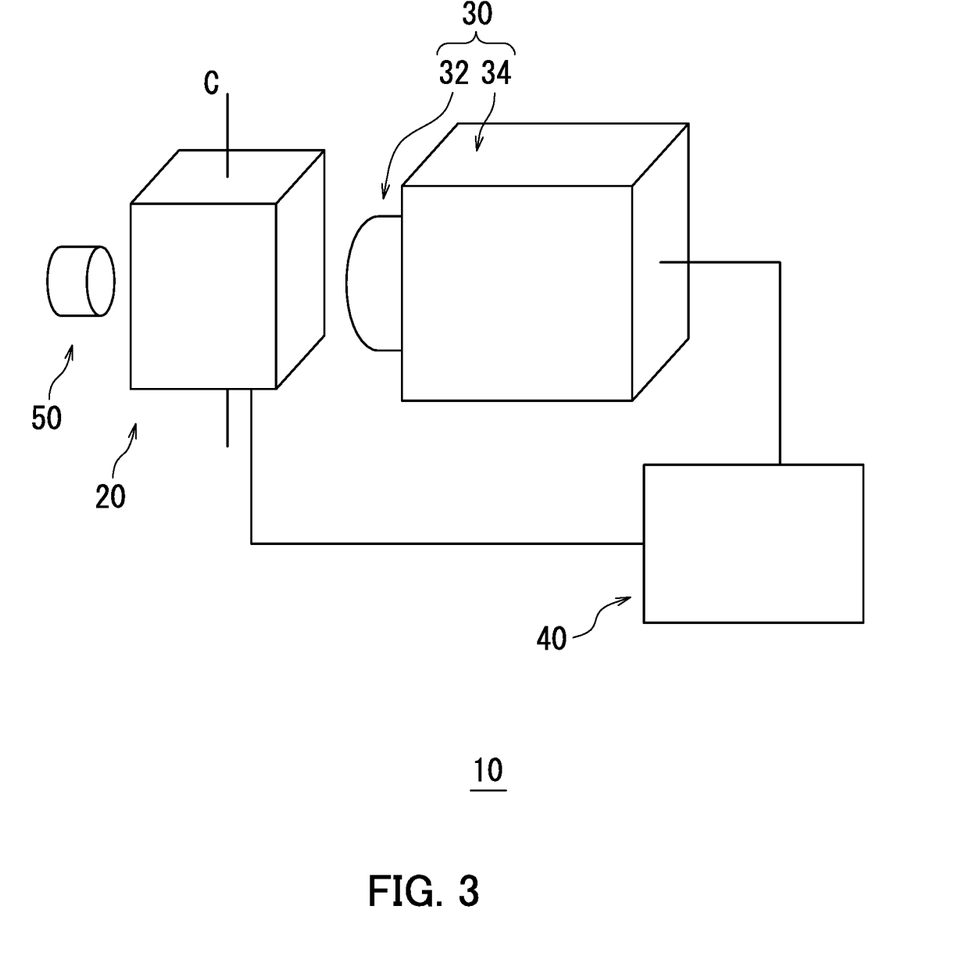
FIG. 3 is a schematic diagram illustrating configuration of a measurement section according to the embodiment of the present invention.

Description will be made next about configuration of the measurement section 30 with reference to FIG. 3. FIG. 3 is a schematic diagram illustrating the configuration of the measurement section 30. As illustrated in FIG. 3, the measurement section 30 includes a zooming section 32 and an imaging section 34.

The dispersoid particle s introduced into the capillary C is zoomed up to an appropriate magnification by the zooming section 32 and imaged by the imaging section 34. For example, the zooming section 32 includes an objective lens and the imaging section 34 includes a charge coupled device (CCD).

Note that provision of the imaging section 34 in the measurement section 30 enables measurement of not only the position but also the particle diameter of the dispersoid particle s. In a configuration in which the radius r of the dispersoid particle s is measured using the measurement section 30, the analyzing apparatus 10 preferably includes a light source 50 that irradiates the capillary C.

The light source 50 is not particularly limited and may be for example a laser light source. Use of a laser light source as the light source 50 can enable analysis of a magnetic migration speed v of the dispersoid particle s by the Laser Doppler method. In a configuration in which the magnetic migration speed v is analyzed by the Laser Doppler method, the imaging section 34 includes a photo multiplier tube. Furthermore, use of a laser light source as the light source 50 can enable analysis of the particle diameter of the dispersoid particle s by a dynamic light scattering method. In a configuration in which the particle diameter of the dispersoid particle s is analyzed by the dynamic light scattering method, the imaging section 34 includes a photo multiplier tube.

Description will be made next about a method for obtaining an amount of the adsorbate (adsorbate amount) included in the second dispersoid particle s2 (details of Step S4). The adsorbate amount can be calculated based on the first and second dispersoid particle volume susceptibilities $\chi$s1 and $\chi$s2. Specifically, the adsorbate amount can be obtained for example using the Langmuir-adsorption isotherm. Alternatively, the adsorbate amount can be obtained through calculation in order described below, for example.

That is, a volume susceptibility difference is obtained by subtracting the first dispersoid particle volume susceptibility $\chi$s1 from the second dispersoid particle volume susceptibility $\chi$s2. An additivity property is true for a product of a volume susceptibility and a volume, and therefore, a product of the volume Vs and the volume susceptibility $\chi$s of the dispersoid particle s is equal to a sum of products of the respective volumes and the respective volume susceptibilities of components of the dispersoid particle s. As such, the volume susceptibility difference between the first and second dispersoid particles s1 and s2 depends on a volume susceptibility and an adsorbate amount of the adsorbate.

Subsequently, a volume susceptibility difference per mass is obtained by multiplying the specific gravity of the adsorbate by the volume susceptibility difference between the first and second dispersoid particles s1 and s2. The volume susceptibility difference per mass is then converted to a molar magnetic susceptibility difference, and the molar magnetic susceptibility difference is divided by a molar magnetic susceptibility of the adsorbate. An adsorbate amount can be obtained from a result of the above division.

Note that respective values of the specific gravity and the molar magnetic susceptibility of the adsorbate may each be a literature value. Alternatively, the specific gravity and the molar magnetic susceptibility of the adsorbate may be obtained through measurement.

The adsorbate is chemically adsorbed to the functional group of the first dispersoid particle s1. As such, the adsorbate amount depends on the amount of the functional group of the first dispersoid particle s1. Specifically, the larger the amount of the functional group present on the surface of a skeletal portion of the first dispersoid particle s1 is, the larger the adsorbate amount is. As such, the amount of the functional group of the first dispersoid particle s1 (amount of the functional group present on the surface of the skeletal portion of the first dispersoid particle s1) can be analyzed based on the adsorbate amount.

Description will be made next with reference to FIG. 4 about a method (details of Step S4) for analyzing an amount of a silanol group (also referred to below as a silanol amount) present on the surface of a skeletal portion of each particle of an octadecyl group bonded silica gel (ODS) using the dispersoid particle analyzing method and the analyzing apparatus 10 according to the present embodiment.

Figure 4:
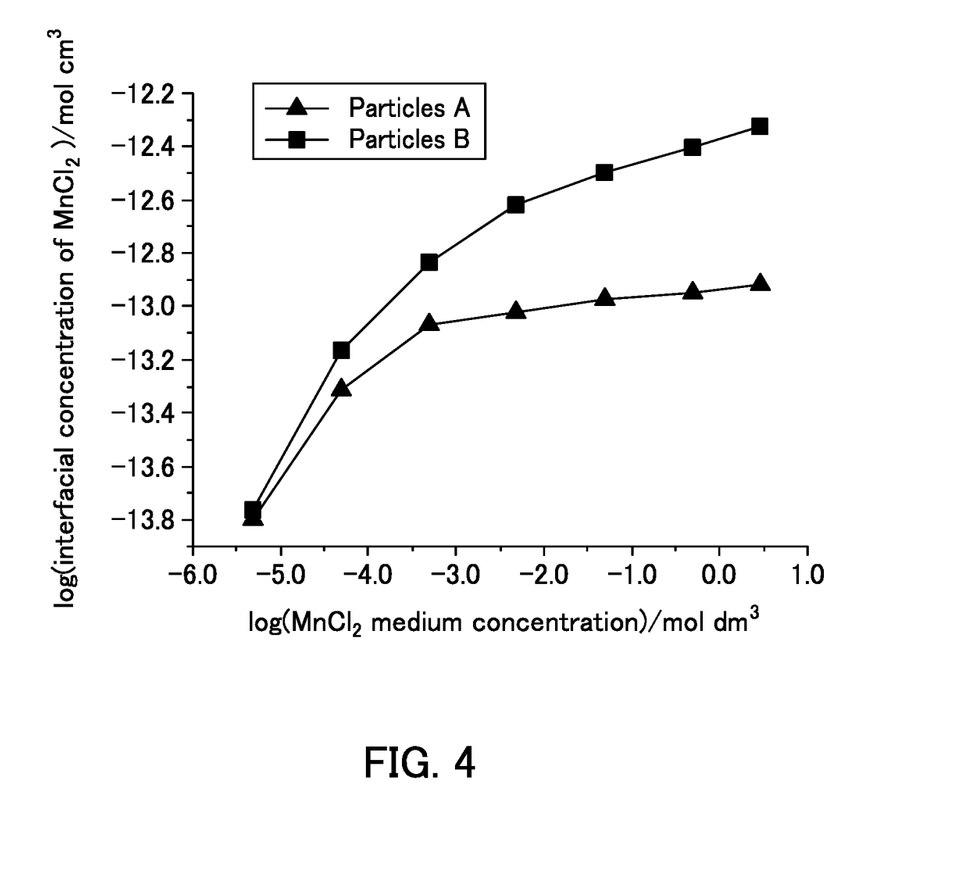
FIG. 4 is a graph representation indicating amounts of an adsorbate included in respective second dispersoid particles according to the embodiment of the present invention.

FIG. 4 is a graph representation indicating the amount (triangles) of an adsorbate included in particles A (an example of the second dispersoid particle s2) and the amount (squares) of an adsorbate included in particles B (another example of the second dispersoid particle s2). Specifically, the particles A were obtained by mixing ODS particles subjected to end capping (an example of the first dispersoid particle s1) with an aqueous solution of acetonitrile/manganese chloride (adsorbent). Also, the particles B were obtained by mixing ODS particles not subjected to end capping (another example of the first dispersoid particle s1) with the aqueous solution of acetonitrile/manganese chloride (adsorbent). The aqueous solution of acetonitrile/manganese chloride is a mixed solution of acetonitrile and an aqueous solution of manganese chloride. In the present embodiment, a volume ratio between the acetonitrile and the aqueous solution of manganese chloride is set at 8:2. Furthermore, acetonitrile was used as the dispersion medium m in measurement of the first and second dispersoid particle volume susceptibilities $\chi$s1 and $\chi$s2.

The ODS particles are produced by causing a silanol group (functional group) present on the surfaces of skeletal portions of porous silica gel particles to react with an octadecylsilane compound. The silanol group includes a hydroxyl group (OH). Therefore, reaction of the silanol group with the octadecylsilane compound makes the porous silica gel particles hydrophobic. However, not all part of the silanol group can be caused to react with the octadecylsilane compound. For the reason as above, the silanol group is present on the surfaces of the skeletal portions of the respective ODS particles. While, the end capping is a treatment for making the ODS particles further hydrophobic. Specifically, the end capping is a treatment by which a silane compound such as trimethyl monochlorosilane is caused to react with the remaining silanol group. Note that it is difficult to thoroughly remove the remaining silanol group even by end capping. For the reason as above, the silanol group is present also on the surfaces of the skeletal portions of the respective ODS particles subjected to end capping.

In the present embodiment, the respective interfacial concentrations of manganese chloride (an example of a compound containing a cationic magnetic material) included in the particles A and the particles B were measured as adsorbate amounts. The horizontal axis in FIG. 4 is a logarithmic scale indicating the concentration of the aqueous solutions of manganese chloride used for obtaining the particles A and the particles B. On the other hand, the vertical axis is a logarithmic scale indicating the respective interfacial concentrations of manganese chloride included in the particles A and the particles B. FIG. 4 accordingly indicates a relationship between the concentration of the aqueous solution of manganese chloride and the respective interfacial concentrations of the manganese chloride included in the particles A and the particles B. Specifically, the respective interfacial concentrations of the manganese chloride included in the particles A and the particles B were obtained using the Langmuir-adsorption isotherm.

As illustrated in FIG. 4, the interfacial concentration (adsorbate amount) of the manganese chloride included in the particles B (squares) increased as the concentration of the aqueous solution of manganese chloride was increased. By contrast, an increase in interfacial concentration of manganese chloride included in the particles A (triangles) saturated. This indicates that the amount of silanol (amount of a functional group) on the ODS particles not subjected to end capping is larger than the amount of silanol (amount of a functional group) on the ODS particles subjected to end capping.

As described above, the interfacial concentration (adsorbate amount) of manganese chloride included in the ODS particles depends on the amount of silanol on the ODS particles (amount of a functional group of the first dispersoid particle s1). Specifically, the interfacial concentration of manganese chloride included in the ODS particles increases as the silanol amount is increased. As such, the silanol amount (functional group amount) can be analyzed based on the concentration of manganese chloride.

Note that the operation section 40 described with reference to FIG. 2 may calculate the adsorbate amount based on the first and second dispersoid particle volume susceptibilities $\chi s1$ and $\chi s2$. The operation section 40 may further analyze the amount of the functional group of the first dispersoid particle s1 based on the adsorbate amount. For example, the operation section 40 may obtain a value (parameter) indicating the amount of the functional group of the first dispersoid particle s1 through calculation (numerical analysis) based on the adsorbate amount.

The embodiment of the present invention has been described so far. However, the present invention is not limited to the above embodiment and various alterations can be made within the scope not departing from the essence of the present invention.

For example, the first and second dispersoid particle volume susceptibilities $\chi s1$ and $\chi s2$ are obtained by magnetophoresis in the above embodiment. However, the method for obtaining the first and second dispersoid particle volume susceptibilities $\chi s1$ and $\chi s2$ is not limited to the method utilizing magnetophoresis. The first and second dispersoid particle volume susceptibilities $\chi s1$ and $\chi s2$ may be obtained using a SQUID element (for example, a magnetic characteristic measuring device, MPMS3 manufactured by Quantum Design Japan, Inc.), a magnetic balance (for example, a magnetic balance, MSB-AUTO manufactured by Solid State Logic Japan K. K.), or the like. Alternatively, the first dispersoid particle volume susceptibility $\chi s1$ may be obtained from a literature value.

INDUSTRIAL APPLICABILITY

The present invention is useful for analysis of a dispersoid particle such as functional particles.

REFERENCE SIGNS LIST

10 analyzing apparatus
20 magnetic field generating section
30 measurement section
40 operation section
50 light source
m dispersion medium
s dispersoid particle
C capillary
D disperse system

The invention claimed is:

1. A dispersoid particle analyzing method comprising:
obtaining a volume susceptibility of a first dispersoid particle;
obtaining a second dispersoid particle that is the first dispersoid particle to which an adsorbate is adsorbed;
obtaining a volume susceptibility of the second dispersoid particle; and
analyzing an amount of a functional group of the first dispersoid particle through obtaining an amount of the adsorbate included in the second dispersoid particle based on the volume susceptibilities of the first and second dispersoid particles, wherein
in obtaining the amount of the adsorbate in the analyzing an amount of a functional group,
a volume susceptibility difference indicating a difference between the volume susceptibility of the first dispersoid particle and the volume susceptibility of the second dispersoid particle, and
the amount of the adsorbate is obtained based on the volume susceptibility difference, a specific gravity of the adsorbate, and a molar magnetic susceptibility of the adsorbate.

2. The dispersoid particle analyzing method according to claim 1, wherein
the amount of the adsorbate is in terms of molar concentration.

3. The dispersoid particle analyzing method according to claim 1, wherein
the volume susceptibility difference is obtained by subtracting the volume susceptibility of the first dispersoid particle from the volume susceptibility of the second dispersoid particle,
a volume susceptibility difference per mass is obtained by multiplying the specific gravity of the adsorbate by the volume susceptibility difference,
the volume susceptibility difference per mass is converted to a molar magnetic susceptibility difference, and
the amount of the adsorbate is obtained from a result obtained by dividing the molar magnetic susceptibility difference by the molar magnetic susceptibility of the adsorbate.

4. The dispersoid particle analyzing method according to claim 1, wherein
in a situation in which the functional group is anionic, the adsorbate contains a cationic magnetic material, or
in a situation in which the functional group is cationic, the adsorbate contains an anionic magnetic material.

5. An analyzing apparatus comprising an operation section, wherein
based on a volume susceptibility of a first dispersoid particle and a volume susceptibility of a second dispersoid particle, the operation section calculates an amount of an adsorbate included in the second dispersoid particle, and the second dispersoid particle is the first dispersoid particle to which the adsorbate is adsorbed, wherein in calculating the amount of the adsorbate, the operation section obtains a volume susceptibility difference indicating a difference between the volume susceptibility of the first dispersoid particle and the volume susceptibility of the second dispersoid particle, and calculates the amount of the adsorbate based on the volume susceptibility difference, the specific gravity of the adsorbate, and the molar magnetic susceptibility of the adsorbate.

6. The analyzing apparatus according to claim 5, wherein the operation section analyses an amount of a functional group of the first dispersoid particle based on the amount of the adsorbate.

7. The analyzing apparatus according to claim 5, wherein the amount of the adsorbate is in terms of molar concentration.

8. The analyzing apparatus according to claim 5, wherein the operation section obtains the volume susceptibility difference by subtracting the volume susceptibility of the first dispersoid particle from the volume susceptibility of the second dispersoid particle, obtains a volume susceptibility difference per mass by multiplying the specific gravity of the adsorbate by the volume susceptibility difference, converts the volume susceptibility difference per mass to a molar magnetic susceptibility difference, and obtains the amount of the adsorbate from a result obtained by dividing the molar magnetic susceptibility difference by the molar magnetic susceptibility of the adsorbate.

9. The analyzing apparatus according to claim 5, further comprising:

a magnetic field generating section; and a measurement section configured to measure movement of a first dispersoid particle dispersed in a dispersion medium and movement of a second dispersoid particle dispersed in the dispersion medium while the magnetic field generating section generates a magnetic field, wherein the operation section calculates the respective volume susceptibilities of the first and second dispersoid particles based on a result of measurement by the measurement section.

10. The analyzing apparatus according to claim 5, wherein in a situation in which the functional group of the first dispersoid particle is anionic, the adsorbate contains a cationic magnetic material, or in a situation in which the functional group of the first dispersoid particle is cationic, the adsorbate contains an anionic magnetic material.

* * * * *